US009661282B2

(12) United States Patent
Manber

(10) Patent No.: US 9,661,282 B2
(45) Date of Patent: May 23, 2017

(54) PROVIDING LOCAL EXPERT SESSIONS

(71) Applicant: Google Inc., Mountain View, CA (US)

(72) Inventor: Udi Manber, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 14/141,208

(22) Filed: Dec. 26, 2013

(65) Prior Publication Data

US 2014/0282043 A1 Sep. 18, 2014

Related U.S. Application Data

(60) Provisional application No. 61/785,085, filed on Mar. 14, 2013.

(51) Int. Cl.
| | |
|---|---|
| G06F 3/00 | (2006.01) |
| H04N 7/18 | (2006.01) |
| H04L 29/06 | (2006.01) |
| H04W 4/02 | (2009.01) |
| G06F 3/01 | (2006.01) |

(52) U.S. Cl.
CPC ......... *H04N 7/185* (2013.01); *H04L 65/1069* (2013.01); *H04L 65/403* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 6,298,308 B1 * | 10/2001 | Reid | G01H 1/003 |
| | | | 702/188 |
| 6,753,899 B2 | 6/2004 | Lapalme et al. | |
| 7,383,190 B1 * | 6/2008 | Petruccelli | G06Q 30/0281 |
| | | | 705/346 |
| 8,266,098 B2 | 9/2012 | Hu et al. | |
| 2003/0140037 A1 * | 7/2003 | Deh-Lee | G06F 17/30011 |
| 2003/0206099 A1 * | 11/2003 | Richman | G08B 13/19608 |
| | | | 340/506 |

(Continued)

OTHER PUBLICATIONS

International Search Report and Written Opinion in International Application No. PCT/US14/22119, mailed on Sep. 4, 2014, 10 pages.

(Continued)

*Primary Examiner* — Toan Vu
(74) *Attorney, Agent, or Firm* — Fish & Richardson P.C.

(57) ABSTRACT

Methods, systems, and apparatus, including computer programs encoded on a computer storage medium, for providing local expert sessions. In one aspect, a method includes receiving a request to initiate a local expert session from a user; identifying available local experts in response to the request, wherein a local expert is a user who has registered to offer local expert sessions in a geographic location relevant to the physical location of the user; selecting an available local expert; and initiating a local expert session between the user and the selected local expert, wherein initiating the local expert session comprises providing video captured by a session accessory worn by the user to a user device for presentation to the selected local expert and establishing communication between the user and the selected local expert.

17 Claims, 2 Drawing Sheets

(56) References Cited

U.S. PATENT DOCUMENTS

| | | | | |
|---|---|---|---|---|
| 2004/0008157 | A1* | 1/2004 | Brubaker | G02B 27/0176 345/8 |
| 2004/0044542 | A1* | 3/2004 | Beniaminy | G06N 5/022 706/45 |
| 2007/0005698 | A1* | 1/2007 | Kumar | G06Q 10/10 709/204 |
| 2007/0206086 | A1* | 9/2007 | Baron | H04N 7/147 348/14.01 |
| 2007/0260587 | A1* | 11/2007 | Mohan | G06Q 10/06 |
| 2008/0294694 | A1* | 11/2008 | Maghfourian | G06F 17/30855 |
| 2008/0306682 | A1* | 12/2008 | Dorfstatter | G01C 21/34 701/408 |
| 2009/0033736 | A1* | 2/2009 | Thomason | H04N 7/147 348/14.02 |
| 2010/0070554 | A1 | 3/2010 | Richardson et al. | |
| 2010/0287685 | A1* | 11/2010 | Peterson | A42B 1/245 2/209.13 |
| 2010/0313335 | A1* | 12/2010 | Waters | A42B 1/244 2/209.13 |
| 2011/0055207 | A1* | 3/2011 | Schorzman | G06F 17/30699 707/723 |
| 2011/0119264 | A1* | 5/2011 | Hu | G06Q 10/00 707/728 |
| 2012/0047147 | A1* | 2/2012 | Redstone | G06F 17/3087 707/748 |
| 2012/0077437 | A1* | 3/2012 | Agevik | G01C 21/20 455/41.2 |
| 2012/0109836 | A1* | 5/2012 | Chen | G06Q 10/10 705/319 |
| 2012/0290950 | A1* | 11/2012 | Rapaport | H04L 51/32 715/753 |
| 2013/0159331 | A1* | 6/2013 | Zhang | G06F 17/30241 707/758 |
| 2013/0174205 | A1* | 7/2013 | Jacobsen | H04N 21/43637 725/81 |
| 2013/0226865 | A1* | 8/2013 | Munemann | G06F 17/30864 707/609 |
| 2013/0293550 | A1* | 11/2013 | Cardno | G06T 13/80 345/428 |
| 2013/0303192 | A1* | 11/2013 | Louboutin | G06Q 30/0261 455/456.3 |
| 2013/0339868 | A1* | 12/2013 | Sharpe | G06F 3/04817 715/739 |
| 2014/0104371 | A1* | 4/2014 | Calman | H04N 7/14 348/14.08 |

OTHER PUBLICATIONS

Freeman, "How OnStar Works," How Stuff Works, Retrieved on Jul. 22, 2014, 8 pages.

McDonald and Cranor, "How Technology Drives Vehicular Privacy," ISJLP, 2005, 36 pages.

Prahalad and Ramaswamy, "The New Frontier of Experience Innovation," MIT Sloan, Management Review, Jul. 2003, 4 pages.

Smirnova and Balog, "A User-Oriented Model for Expert Finding," Advances Info Retrieval Lecture Notes Computer Sci., 2011, 6611:580-592.

Staab and Werthner, "Trends Controversies: Intelligent Systems for Tourism," IEEE, 2002, 53-66.

* cited by examiner

PROVIDING LOCAL EXPERT SESSIONS

CROSS-REFERENCE TO RELATED APPLICATION

This application claims priority to U.S. Provisional Application No. 61/785,085, filed on Mar. 14, 2013. The disclosure of the prior application is considered part of and is incorporated by reference in the disclosure of this application.

BACKGROUND

This specification relates to interactive environments that connect network-enabled communication devices. Various types of devices, e.g., desktop computers and mobile phones, can communicate with one another using various data communication networks, e.g., the Internet.

SUMMARY

This specification describes technologies relating to providing local expert sessions to users.

In general, one innovative aspect of the subject matter described in this specification can be embodied in methods that include the actions of receiving a request to initiate a local expert session from a user; identifying available local experts in response to the request, wherein a local expert is a user who has registered to offer local expert sessions in a geographic location relevant to the physical location of the user; selecting an available local expert; and initiating a local expert session between the user and the selected local expert, wherein initiating the local expert session comprises providing video captured by a session accessory worn by the user to a user device for presentation to the selected local expert and establishing communication between the user and the selected local expert.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Selecting the available local expert can include: ranking the available local experts; providing data identifying the available local experts for presentation to the user in accordance with the ranking; and receiving a user input selecting an available local expert.

Selecting the available local experts can include: ranking the available local experts; and selecting a highest-ranked available local expert without further user input.

Ranking the available local experts can include ranking the available local experts based on whether the available local experts are in a social network of the user.

The actions can further include determining the physical location of the user from coordinates received from the session accessory worn by the user.

Establishing communication between the user and the selected local expert can include establishing audio communication between the user and the selected local expert.

Particular embodiments of the subject matter described in this specification can be implemented so as to realize one or more of the following advantages. Users of a local expert session system that need assistance or advice about a location can easily be connected with a local expert that has knowledge about the location and can assist the user. The expert can better assist the user by viewing live video and, optionally, audio captured by a session accessory worn by the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
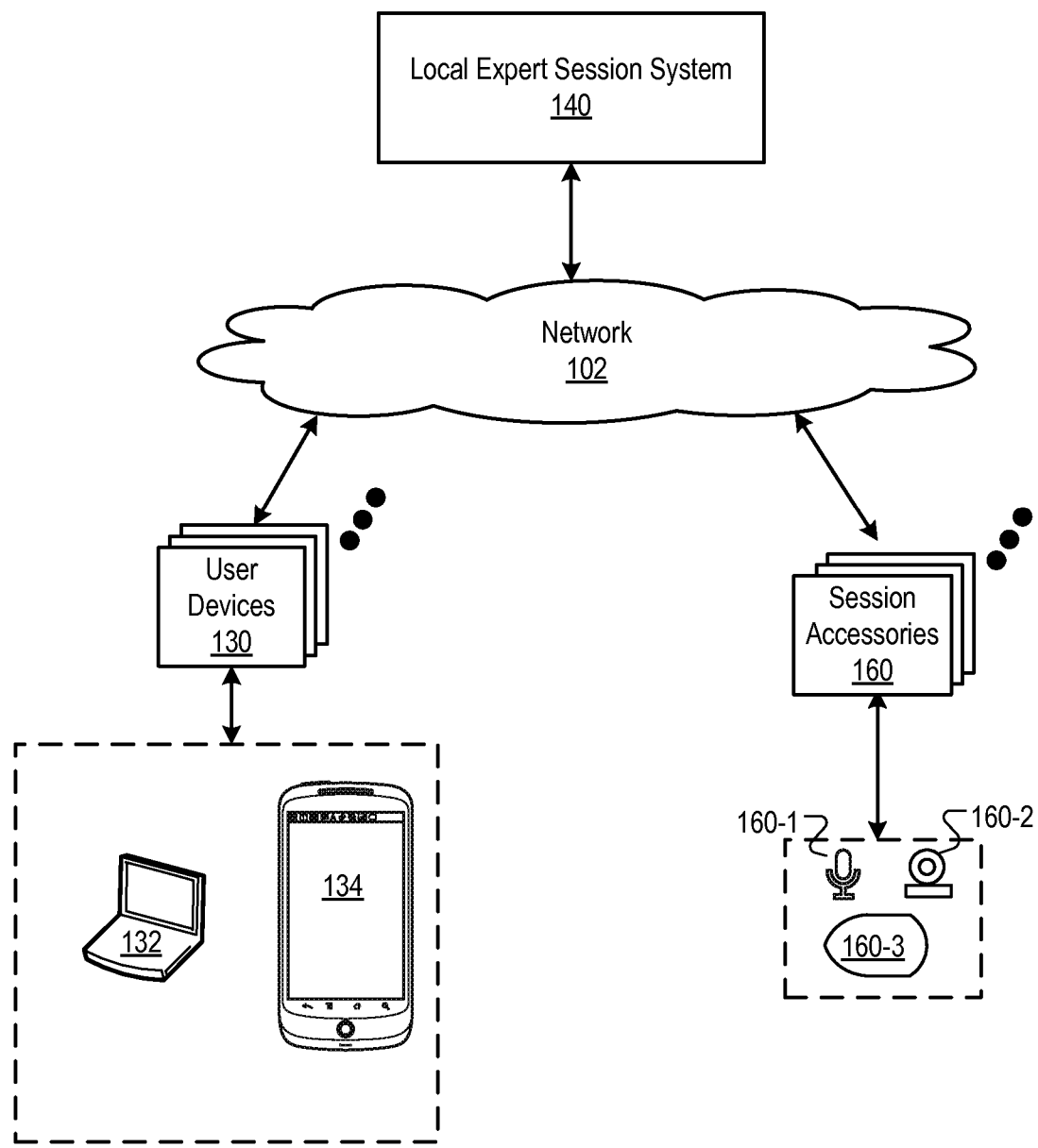
FIG. 1 shows an example local expert session system.

FIG. 1 shows an example local expert session system 140. The local expert session system 140 is an example of a system implemented as computer programs on one or more computers in one or more locations, in which the systems, components, and techniques described below can be implemented.

A user can interact with the local expert session system 140 using a user device 130 through a data communication network 102. The network 102 enables data communication between multiple electronic devices. Users can access content, provide content, exchange information, and participate in local expert sessions by use of the devices and systems that can communicate with each other over the network 102. The network 102 can include, for example, a local area network (LAN), e.g., a Wi-Fi network, a cellular phone network, a wide area network (WAN), e.g., the Internet, or a combination of them.

A user device 130 is an electronic device, or collection of devices, that is under the control of a user and is capable of interacting with the local expert session system 140 over the network 102. Example user devices 130 include personal computers 132, mobile communication devices 134, and other devices that can send and receive data over the network 102. A user device 130 is typically configured with a user application, e.g., a web browser, that sends and receives data over the network 102, generally in response to user actions. The user application can enable a user to display and interact with text, images, videos, music and other content, which can be located on a web page on the World Wide Web or a local area network.

The local expert session system 140 allows people to organize, request, and participate in local expert sessions. In a local expert session, one person, the local expert, offers advice or assistance to another person while viewing video captured by a session accessory 160 worn by the other person. The local expert is a person who has been recognized by the system 140 as an expert on the geographic area in which the other person is located or on a point of interest near to the location of the other person. During the session, the person in need of advice or assistance can play an active role, e.g., by asking questions, and information can go in both directions during the session. The term "local expert session" may thus refer to such an interaction, the period of interaction, or a recording of such an interaction, as the context requires.

In particular, the local expert session system 140 allows users having a session accessory 160 to receive assistance from local experts who are viewing a video feed of video captured by the session accessory 160 on user devices 130.

A local expert is a user who has registered with the local expert session system 140 in order to be accepted by the local expert session system 140 to participate in local expert sessions that are relevant to a specified geographic location or region, to a specific site or facility, or to a particular point of interest, i.e., to provide assistance to users located there. For example, a user can register as a local expert for the town of Lodi, Calif. or for the Taj Mahal. Local expert sessions are described in more detail below with reference to FIG. 2.

In general, session accessories 160 are devices that a person can use to participate in sessions with the local expert session system 140. Session accessories 160 will typically be portable, personal, multimode, e.g., audio and video, electronic devices. Session accessories 160 can be, for example, wearable computing devices that include a camera and a microphone that may be worn on a user's person. For example, a session accessory 160 can include a hat camera system that includes a camera mounted on a hat, e.g., on the brim of a hat, which can connect wirelessly to the local expert session system 140, e.g., by connecting wirelessly to a mobile computing system, e.g., a mobile phone or other mobile device, that can connect to the local expert session system 140 or by connecting to the local expert session system 140 over a Wi-Fi network. An example hat camera system is described in more detail in U.S. Patent Application No. 61/781,506, entitled "Wearable Camera Systems" and filed on Mar. 14, 2013. Session accessories 160 can also include other camera systems that are worn by a person and that provide point-of-view video data, for example, a helmet-mounted camera. Generally, a session accessory 160 is a system that includes one or more of an audio input device 160-1, a video input device 160-2, a display device 160-3, and optionally other input devices, e.g., for text or gesture input.

A session accessory 160 may be used during a local expert session to broadcast video taken from the point of view of a user wearing the session accessory 160 to the local expert that is participating in the session. In implementations where the session accessory 160 connects wirelessly to a mobile device, the mobile device can be configured to communicate with the local expert session system 140 through an application executing on the mobile device. Optionally, the zoom and position of the video input device 160-2 may be controllable by the local expert that is participating in a session by submitting an input to the local expert session system 140. For example, the local expert may be able to adjust the zoom or the position of the video input device in order to have a better view of a street sign or other landmark while the user in need of assistance is driving.

Figure 2:
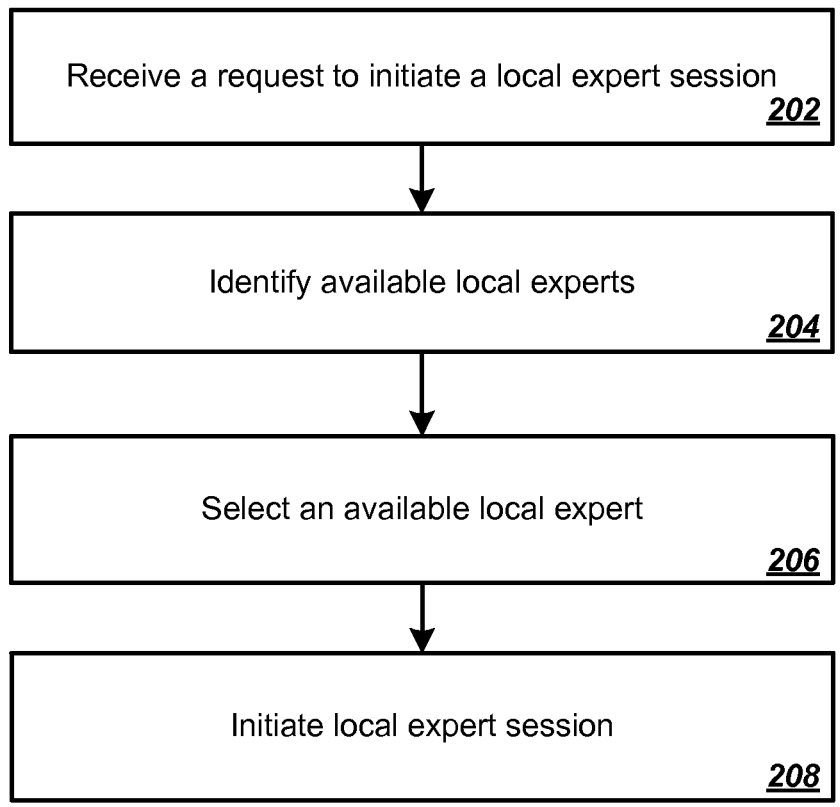
FIG. 2 is a flow diagram of an example process for initiating a local expert session.

FIG. 2 is a flow diagram of an example process 200 for initiating a local expert session. For convenience, the process 200 will be described as being performed by a system of one or more computers located in one or more locations. For example, a local expert session system, e.g., the local expert session system 140 of FIG. 1, appropriately programmed, can perform the process 200.

The system receives a request to initiate a local expert session from a user (step 202). For example, the user may submit a request using a session accessory or using a separate user device. In some implementations, the user can submit a request by speaking a pre-determined voice command that is recognized by the session accessory or other user device and causes the session accessory or other user device to submit a request to the system. The request identifies a physical location of the user. For example, the user may manually enter the location through a user interface provided by the system or the system can obtain data identifying the user's location, e.g., by receiving coordinates from a Global Positioning System (GPS) of the session accessory or other user device being used by the user or by otherwise determining the location of the user's session accessory or mobile device using conventional techniques.

The system identifies available local experts in response to the request (step 204). The local experts are users that have been accepted by the system to offer local expert sessions in the physical location identified in the request. The system may determine which local experts of the local experts registered with the system for the physical location are available when the request is received in any of a variety of ways.

For example, the system can make the determination based on availability data received from the local experts that identifies time periods during which the local experts are available to participate in local expert sessions. As another example, the system can make the determination based on which local experts are currently logged in to the system or based on data that identifies a current presence status of the local experts, i.e., active, idle, busy, or offline.

The system selects an available local expert (step 206). In some implementations, the system ranks the available local experts, provides a user interface for presentation to the user that identifies available local experts in an order according to the ranking, and receives input from the user selecting one of the local experts.

However, in some circumstances, e.g., while driving, it may not be convenient for a user to select from identified local experts. Therefore, in some implementations, the system ranks the available local experts and selects a candidate local expert based on the ranking, i.e., without further user input. The system can rank the available local experts based on any of a variety of factors.

For example, the system can rank the available local experts based at least in part on ratings provided from previous users that have participated in a local expert session with the local expert. As another example, the system can rank the available local experts based at least in part on a count of local expert sessions participated in by the local expert. As another example, the system can rank the available local experts based at least in part on the amount of money charged by the local experts for participating in the session. As another example, the system can rank the available local experts based at least in part on one or more user-specific factors, e.g., whether the local expert has previously participated in a local expert session with the user or whether the local expert is in the user's social network.

The system initiates a local expert session between the selected local expert and the user (step 208). That is, the system provides a live feed of video captured by the session accessory worn by the user to a user device for presentation to the local expert and establishes audio communication between the user and the local expert. During the session, the local expert can answer questions, provide advice, or otherwise assist the user by providing information that is relevant to the location but that is not known by the user. As described above, during the session, the local expert may be able to adjust the zoom or the position of a video input device included in the session accessory worn by the user in order to better assist the user during the session. That is, the system may receive a request to adjust the zoom or the position of the video input device and transmit instructions to the session input device that cause the session accessory to adjust the zoom or position of the device accordingly.

In some implementations, instead of or in addition to establishing audio communication between the local expert and the user, the system may enable communication using a different means, e.g., using text messages, e.g., Short Message Service (SMS) messages. Similarly, instead of or in addition to providing the live video captured by the user's session accessory to the local expert, the system may provide other signals to the local expert, e.g., the location of the user as captured by the session accessory or temperature readings captured by the session accessory.

While the above description describes local expert sessions as connecting a user with an expert that is knowledgeable about an area in which the user is currently located, in some implementations, users may be able to initiate local expert sessions with local experts that are experts on other locations of interest to the user, i.e., to specify a location that is different from the user's current location. For example, a user may be able to input a destination and be connected to an expert that can help the user select a hotel for an upcoming vacation to the destination or to select an apartment to rent before the user moves to the destination.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by a local expert session system, a request to initiate a local expert session from a user of the local expert session system;
   determining, by the local expert session system, a physical location in which the user is currently located from coordinates received from a session accessory worn by the user, wherein the session accessory worn by the user of the local expert session system captures video from a point of view of the user;
   identifying, by the local expert session system, a plurality of local experts, wherein each local expert is a user of the local expert session system who has been recognized by the local expert session system as an expert on a point of interest that is near to the physical location in which the user is currently located;
   identifying, by the local expert session system and from the plurality of local experts, local experts that are available to participate in the local expert session;
   selecting an available local expert;
   initiating, by the local expert session system, a local expert session between the user and the selected local expert, wherein initiating the local expert session comprises providing video captured by the session accessory worn by the user to a user device for presentation to the selected local expert and establishing communication between the user and the selected local expert; and
   during the local expert session, (i) receiving, by the local expert session system and from the user device that presents video captured by the session accessory, a request to adjust a video input device of the session accessory; and (ii) transmitting, by the local expert session and to the session accessory, instructions that cause the session accessory to adjust the video input device according to the request.

2. The method of claim 1, wherein selecting the available local expert comprises:
   ranking the available local experts;
   providing data identifying the available local experts for presentation to the user in accordance with the ranking; and
   receiving a user input selecting an available local expert.

3. The method of claim 1, wherein selecting the available local experts comprises:
   ranking the available local experts; and
   selecting a highest-ranked available local expert without further user input.

4. The method of claim 3, wherein ranking the available local experts comprises ranking the available local experts based on whether the available local experts are in a social network of the user.

5. The method of claim 1, wherein establishing communication between the user and the selected local expert comprises establishing audio communication between the user and the selected local expert.

6. The method of claim 1, wherein the request to adjust the video input device of the session accessory includes a request to adjust the zoom of the video input device.

7. The method of claim 1, wherein the request to adjust the video input device of the session accessory includes a request to adjust the position of the video input device.

8. A local expert session system comprising one or more computers and one or more storage devices storing instructions that, when executed by the one or more computers, cause the one or more computers to perform operations comprising:
   receiving, by a local expert session system, a request to initiate a local expert session from a user of the local expert session system;
   determining, by the local expert session system, a physical location in which the user is currently located from coordinates received from a session accessory worn by the user, wherein the session accessory worn by the user of the local expert session system captures video from a point of view of the user;
   identifying, by the local expert session system, a plurality of local experts, wherein each local expert is a user of the local expert session system who has been recognized by the local expert session system as an expert on a point of interest that is near to the physical location in which the user is currently located;
   identifying, by the local expert session system and from the plurality of local experts, local experts that are available to participate in the local expert session;
   selecting an available local expert;
   initiating, by the local expert session system, a local expert session between the user and the selected local expert, wherein initiating the local expert session comprises providing video captured by the session accessory worn by the user to a user device for presentation to the selected local expert and establishing communication between the user and the selected local expert; and during the local expert session, (i) receiving, by the local expert session system and from the user device that presents video captured by the session accessory, a request to adjust a video input device of the session accessory; and (ii) transmitting, by the local expert session and to the session accessory, instructions that cause the session accessory to adjust the video input device according to the request.

9. The system of claim 8, wherein selecting the available local expert comprises:
ranking the available local experts;
providing data identifying the available local experts for presentation to the user in accordance with the ranking; and
receiving a user input selecting an available local expert.

10. The system of claim 8, wherein selecting the available local experts comprises:
ranking the available local experts; and
selecting a highest-ranked available local expert without further user input.

11. The system of claim 10, wherein ranking the available local experts comprises ranking the available local experts based on whether the available local experts are in a social network of the user.

12. The system of claim 8, wherein establishing communication between the user and the selected local expert comprises establishing audio communication between the user and the selected local expert.

13. A non-transitory computer storage medium encoded with instructions that, when executed by one or more computers, cause the one or more computers to perform operations comprising:
receiving, by a local expert session system, a request to initiate a local expert session from a user of the local expert session system;
determining, by the local expert session system, a physical location in which the user is currently located from coordinates received from a session accessory worn by the user, wherein the session accessory worn by the user of the local expert session system captures video from a point of view of the user;
identifying, by the local expert session system, a plurality of local experts, wherein each local expert is a user of the local expert session system who has been recognized by the local expert session system as an expert on a point of interest that is near to the physical location in which the user is currently located;
identifying, by the local expert session system and from the plurality of local experts, local experts that are available to participate in the local expert session;
selecting an available local expert;
initiating, by the local expert session system, a local expert session between the user and the selected local expert, wherein initiating the local expert session comprises providing video captured by the session accessory worn by the user to a user device for presentation to the selected local expert and establishing communication between the user and the selected local expert; and during the local expert session, (i) receiving, by the local expert session system and from the user device that presents video captured by the session accessory, a request to adjust a video input device of the session accessory; and (ii) transmitting, by the local expert session and to the session accessory, instructions that cause the session accessory to adjust the video input device according to the request.

14. The non-transitory computer storage medium of claim 13, wherein selecting the available local expert comprises:
ranking the available local experts;
providing data identifying the available local experts for presentation to the user in accordance with the ranking; and
receiving a user input selecting an available local expert.

15. The non-transitory computer storage medium of claim 13, wherein selecting the available local experts comprises:
ranking the available local experts; and
selecting a highest-ranked available local expert without further user input.

16. The non-transitory computer storage medium of claim 15, wherein ranking the available local experts comprises ranking the available local experts based on whether the available local experts are in a social network of the user.

17. The non-transitory computer storage medium of claim 13, wherein establishing communication between the user and the selected local expert comprises establishing audio communication between the user and the selected local expert.

* * * * *